United States Patent
Allen et al.

(10) Patent No.: US 9,824,439 B2
(45) Date of Patent: Nov. 21, 2017

(54) METHOD FOR INDICATING A CHARACTERISTIC OF BONE MINERAL DENSITY

(75) Inventors: Philip Daniel Allen, Sheffield (GB); Keith Horner, Manchester (GB); Jim Graham, Lancashire (GB); Hugh Devlin, Cheshire (GB)

(73) Assignee: Manchester Imaging Limited, Stockport (GB)

( * ) Notice: Subject to any disclaimer, the term of this patent is extended or adjusted under 35 U.S.C. 154(b) by 2021 days.

(21) Appl. No.: 12/678,648

(22) PCT Filed: Sep. 9, 2008

(86) PCT No.: PCT/GB2008/003037
§ 371 (c)(1),
(2), (4) Date: Mar. 17, 2010

(87) PCT Pub. No.: WO2009/037421
PCT Pub. Date: Mar. 26, 2009

(65) Prior Publication Data
US 2010/0215229 A1    Aug. 26, 2010

Related U.S. Application Data

(60) Provisional application No. 60/974,421, filed on Sep. 21, 2007.

(30) Foreign Application Priority Data

Sep. 21, 2007  (GB) .................................. 0718534.1

(51) Int. Cl.
G06Q 10/00   (2012.01)
G06Q 50/00   (2012.01)
G06T 7/00    (2017.01)

(52) U.S. Cl.
CPC ................................. *G06T 7/0012* (2013.01)

(58) Field of Classification Search
CPC ............................. G06Q 50/22; G06Q 50/24
(Continued)

(56) References Cited

U.S. PATENT DOCUMENTS 7,602,955 B2 *  10/2009  Taguchi et al. ............... 382/132
2006/0052304 A1 *  3/2006  Stewart .......................... 514/12
(Continued)

OTHER PUBLICATIONS

Karayianni et al. (Accuracy in osteoporosis diagnosis of a combination of mandibular cortical width measurement on dental panoramic radiographs and a clinical risk index (OSIRIS): Sep. 18, 2006).*
(Continued)

*Primary Examiner* — Neha Patel
(74) *Attorney, Agent, or Firm* — Faegre Baker Daniels, LLP

(57) ABSTRACT

A method of generating an indication of at least one characteristic of a patient's bone mineral density. The method comprises obtaining at least one measurement of a width of a patient's inferior mandibular cortex and generating said indication based upon said at least one measurement. The at least one measurement is obtained at a location along the inferior mandibular cortex between the ante-gonion and a point on the inferior mandibular cortex defined with reference to the mental foramen.

11 Claims, 12 Drawing Sheets

(58) Field of Classification Search
USPC .......................................................... 705/2, 3
See application file for complete search history.

(56) References Cited

U.S. PATENT DOCUMENTS

2007/0058786 A1* 3/2007 Michael .................... 378/207
2007/0286467 A1* 12/2007 Asano et al. ............... 382/128

OTHER PUBLICATIONS

International Search Report and Written Opinion from PCT Application No. PCT/GB2008/003037 (15 pages).

Allen, P.D. et al., "Detecting Osteoporosis From Dental Radiographs Using Active Shape Models," 4th IEEE International Symposium on Biomedical Imaging, Apr. 1, 2007, pp. 1256-1259.

Yang, J. et al., "The effect of ovariectomy on mandibular cortical thickness in the rat," Journal of Dentistry, Feb. 1, 2005, pp. 123-129, vol. 33, Elsevier.

Karayianni, K. et al., "Accuracy in osteoporosis diagnosis of a combination of mandibular cortical width measurement on dental panoramic radiographs and a clinical risk index (OSIRIS): The OSTEODENT project," Bone, Dec. 5, 2006, pp. 223-229, vol. 40, Elsevier.

Horner, K. et al., "The Mandibular Cortex on Radiographs as a Tool for Osteoporosis Risk Assessment: The OSTEODENT Project," Journal of Clinical Densitometry, May 6, 2007, pp. 138-146, vol. 10.

Nackaerts, O. et al., "Bone density measurements in intra-oral radiographs," Clinical Oral Investigations, Feb. 15, 2007, pp. 225-229, vol. 11, Springer.

Allen, P.D. et al., "Detecting Reduced Bone Mineral Density From Dental Radiographs Using Statistical Shape Models," IEEE Transactions on Information Technology in Biomedicine, Nov. 1, 2007, pp. 601-610, vol. 11, No. 6.

\* cited by examiner

METHOD FOR INDICATING A CHARACTERISTIC OF BONE MINERAL DENSITY

CROSS-REFERENCE TO RELATED APPLICATIONS

This application is a nationalization of PCT Patent Application Ser. No. PCT/GB2008/003037, filed Sep. 9, 2008, which claims the benefit of U.S. Application No. 60/974,421 and British Application No. 0718534.1 both filed on Sep. 21, 2007, the disclosures of which are expressly incorporated herein by reference.

The present invention relates to methods for generating an indication of a characteristic of a patient's bone mineral density. More specifically, the present invention relates to methods for generating an indication of a characteristic of a patient's bone mineral density based upon a measurement of the patient's inferior mandibular cortex.

Osteoporosis is a serious disease caused by reduced bone mineral density. It is known to be desirable to diagnose osteoporosis early so that treatment can be instituted. If left untreated, osteoporosis is likely to cause bone fractures which may be serious, particularly in elderly individuals.

It is known that various groups are at particular risk of osteoporosis, for example post-menopausal women. However recent studies have shown that even in high risk groups large numbers of patients are not screened, such that osteoporosis is only diagnosed after the occurrence of a bone fracture.

Accurate diagnosis of osteoporosis is possible using dual-energy X-ray absorptiometry (DXA). However such investigations are expensive, and there is therefore a need to effectively select individuals who are at particular risk of osteoporosis and who should consequently be referred for DXA investigations.

Osteopenia is a condition in which a patient has reduced bone mineral density, but not sufficiently reduced to be diagnosed as osteoporotic. Given that the osteopenia is often a precursor condition to osteoporosis, its detection is also clinically valuable.

It is an object of some embodiments of the present invention to obviate or mitigate the problems outlined above. It is a further object of embodiments of the invention to provide an effective indication of reduced bone mineral density.

According to a first aspect of the invention, there is provided a method of generating an indication of at least one characteristic of a patient's bone mineral density, the method comprising: obtaining at least one measurement of a width of a patient's inferior mandibular cortex, and generating said indication based upon said at least one measurement, wherein said at least one measurement is obtained at a location along the inferior mandibular cortex between the ante-gonion and a point on the inferior mandibular cortex defined with reference to the mental foramen.

The point on the inferior mandibular cortex defined with reference to the mental foramen may be such that a distance to the mental foramen from the point along a normal to the point, is a minimum for all points on the inferior mandibular cortex.

The characteristic of the patient's bone mineral density may be low bone mineral density. The characteristic of the patient's bone mineral density may be low bone mineral density indicative of osteoporosis or osteopenia.

The location may be selected to provide an optimal indication of the characteristic of the patient's bone mineral density. For example the location may be between approximately 20% to 40% of the distance between the ante-gonion and the point defined with reference to the mental foramen and most preferably about 25% of the distance between the ante-gonion and the point defined with reference to the mental foramen.

The method may further comprise obtaining a plurality of measurements of width of the patient's inferior mandibular cortex, and determining a mean of the obtained measurements. Obtaining at least one measurement of a width of a patient's inferior mandibular cortex may comprise processing image data to obtain the at least one measurement of the width of the patient's inferior mandibular cortex.

Generating said indication of at least one characteristic of a patient's bone mineral density may further comprise receiving data indicating at least one clinical parameter associated with the patient and combining said at least one measurement and said clinical parameter. Said at least one clinical parameter may be an index based upon a plurality of clinical parameters. The index may be based upon a plurality of parameters selected from the group comprising of patient's body weight, patient's age, patient's fracture history, and patient's medication history. The index may be the Osteoporosis index of risk (OSIRIS).

The inventors have realised that by combining data indicating at least one measurement of patient's inferior mandibular cortex with data indicating at least one clinical parameter a particularly effective indication of a characteristic of the patients bone mineral density can be obtained.

Various clinical indices have been developed which process a number of factors relating to a patient (for example, age, body weight, fracture history) and generate a score. The value of the generated score is indicative of a risk of osteoporosis, and a decision as to whether to refer the patient for DXA investigations can be taken based upon the value of the score. Although of some use, such scores when used alone have been found to have limited accuracy, producing unacceptable numbers of false positive and false negative indications.

Similarly, although in Devlin H; and Horner K: "Mandibular radiomorphphometric indices in the diagnosis of reduced skeletal bone mineral density" Osteoporosis Int. vol 13(5), pp 373-378, May 2002 it was suggested that width (sometimes referred to as thickness) of a patient's inferior mandibular cortex was a good indication of a patient's bone mineral density, use of such an indicator alone sometimes provides an insufficiently robust indicator of reduced bone mineral density.

The method may further comprise receiving image data at least partially defining an image of the patient's inferior mandibular cortex and processing said image data to determine said at least one measurement of the patient's mandibular cortex. Said image data may be based upon a panoramic dental radiograph or panoramic dental tomogram.

The width measurement may be obtained between at least one pair of points located respectively on the upper and lower borders of the inferior mandibular cortex. The method may comprise obtaining a plurality of width measurements between respective pairs of points, wherein one point of each pair is located on an upper border of the inferior mandibular cortex and the other point of each pair is located on a lower border of the inferior mandibular cortex and determining a mean of the obtained measurements.

The method may further comprise arranging a further diagnostic test for the patient based upon said indication. The further diagnostic test may comprise dual energy X-ray absorptiometry (DXA).

Obtaining at least one measurement of a width of a patient's inferior mandibular cortex may further comprise: receiving image data comprising image data representing the patient's lower mandibular cortex, fitting a model to a part of the image data and obtaining said measurement from points of said model as fitted to said part of said image data.

According to a second aspect of the present invention there is provided a method of obtaining a measurement of width of a patient's inferior mandibular cortex, the method comprising: receiving image data comprising image data representing the patient's lower mandibular cortex, fitting a model to a part of the image data, and obtaining said measurement from points of said model as fitted to said part of said image data.

The model may be a shape model or a point distribution model. For example the model may be an Active Shape Model. However, in general terms it will be appreciated that the methods described herein can be carried out using any suitable models generated using any image modelling technique which models shape and/or appearance. For example, a Fourier Model may be used.

The model may define at least part of a lower border of the inferior mandibular cortex, and at least part of an upper border of the inferior mandibular cortex. For example, the model may define upper and lower borders of the patient's inferior mandibular cortex between the ante-gonion and mental cortical region on the left and right mandible.

The at least one measurement of the patient's inferior mandibular cortex may be obtained using a method according to the first embodiment of the invention.

Fitting a model to a part of the image data may comprise: fitting a further model to a part of the image data and fitting said model to a part of the image data based upon said fitting of said further model.

The further model may define at least part of a lower border of the inferior mandibular cortex. Fitting said further model may be initialised by marking points of predetermined features in said image data.

Fitting the or each shape model to the image data may be based upon intensity gradient within the image data.

The method may further comprise generating the or each model by a training process based upon a plurality of training images. The training process may be based upon human indication of points within said training images.

All aspects of the present invention can be implemented by way of methods, systems and apparatus. Embodiments of the invention can also be implemented by way of suitable computer programs. Accordingly, the invention provides such computer programs and further provides computer readable media carrying such computer programs. Such computer readable media include tangible carrier media such as CD's, DVD's and floppy disks and intangible carrier media such as communication signals. Embodiments of the present invention will now be described, by way of example, with reference to the accompanying drawings, in which:

Figure 1:
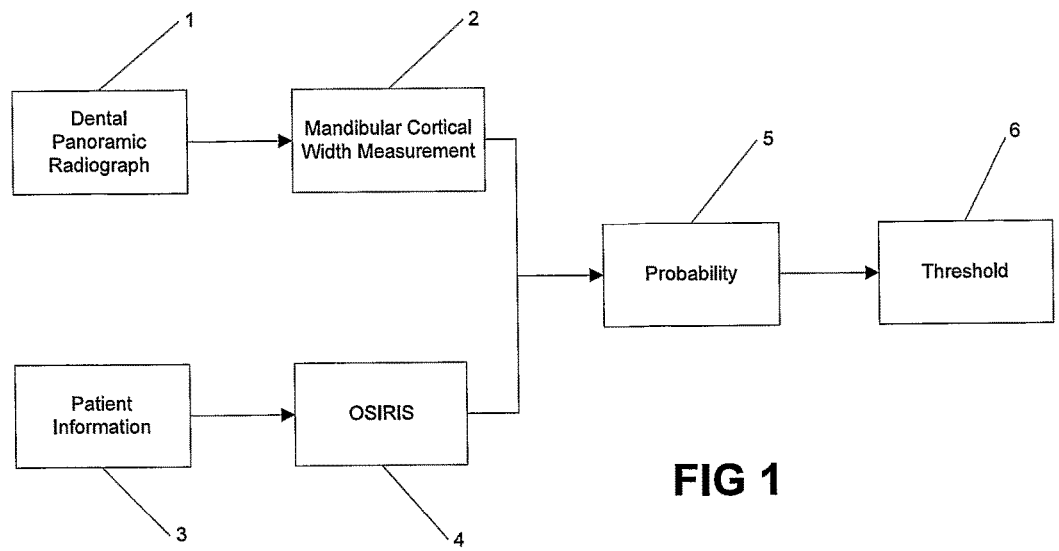
FIG. 1 is a schematic illustration of a process for generating an indication of whether a patient is osteoporotic.

An overview of a process for determining whether a patient is osteoporotic is now provided with reference to FIG. 1. Image data 1 in the form of a panoramic dental tomogram or radiograph is processed so as to obtain a measurement of a width 2 of the patient's inferior mandibular cortex. Data relating to clinical parameters associated with the patient 3 is also obtained, and processed so as to generate a score 4 as defined by the Osteoporosis Index of Risk (OSIRIS) which is described in further detail below. The OSIRIS can be defined as a weighted combination of those clinical risk factors that are known to independently predict whether a patient has osteoporosis, as described below.

The score 4 defined by the OSIRIS is combined with the measurement of width of the inferior mandibular cortex 2 so as to generate data 5 indicating a probability that the patient is osteoporotic. A threshold 6 can be applied to the data 5 to produce an indication as to whether the patient should undergo further investigation as to whether he or she is osteoporotic.

Figure 2:
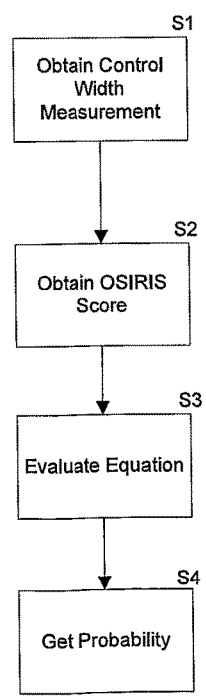
FIG. 2 is a flowchart of processing carried out in the process of FIG. 1.

A process for combining an inferior cortical width measurement with a score provided by the OSIRIS is now presented with reference to FIG. 2. At step S1 the cortical width measurement is obtained. At step S2 a score given by the OSIRIS is obtained. At step S3 the width measurement and score are input to an equation of the form:

$$P(O) = \frac{1}{1+e^{-Z}} \qquad (1)$$

where
P(O) is the probability of osteoporosis; and
Z is given by equation (2):

$$Z = a - bO + cM \qquad (2)$$

where
a is a constant scalar shift value;
b is a constant scalar value to be multiplied by the OSIRIS value;
O is the OSIRIS value;
c is a constant scalar value to be multiplied by the cortical width measurement; and
M is the cortical width measurement.

The values of the constants a, b and c in equation (2) are determined by logistic regression based upon appropriate training data as described below. In one embodiment of the invention the values are such that equation (2) becomes:

$$Z = 6.60 - 0.52O - 2.1M \qquad (3)$$

At step S4 the result of equation (1) is output to provide a probability that the patient is osteoporotic.

As indicated, equation (2) includes a number of constants which are determined by a logistic regression process applied to a training set of data. The training set comprises data for a plurality of patients. For each patient represented by data in the training set data indicating a mandibular cortex width and data indicating an OSIRIS score is included, together with data indicating whether the patient actually has osteoporosis. That is, the training set comprises a plurality of triples of the form:

(Cortical Width, Osiris, Osteoporosis)

The data indicating whether a patient suffers from osteoporosis is a measure which is considered to provide a reliable indication of whether a patient actually has osteoporosis. In some embodiments such data is obtained from dual-energy X-ray absorptiometry (DXA) data of a patient's proximal femur and lumbar spine. Such data can be collected using a GE Lunar DPX-L scanner, available from GE Lunar Corporation of Madison, Wis., USA. Bone mineral density (BMD) values can be determined using such DXA, and manufacturers of appropriate equipment provide data indicating expected BMD values. Such expected BMD values can be compared to a value obtained for a particular patient to determine whether the patient is in fact osteoporotic. In more detail, a mean value is obtained from the manufacturer's data, and a T score is determined by the number of standard deviations a patient's BMD value lies from the mean standard value of a young adult. A T score between −1 and −2.5 is considered to indicate that a patient is not yet osteoporotic but is osteopenic. A T-score less than −2.5 is considered to indicate that the patient is osteoporotic.

Triples of the form described above are processed so as to provide the constants included in equation (1). Such processing uses logistic regression. In general terms, this process generates the constants so as to provide an output accurately providing the probability of osteoporosis based upon the values of the OSIRIS score and cortical width measurement, both of which are independent variables. Given that the dependent variable (i.e. the prediction of osteoporosis) is a binary value in that a patient either has or does not have osteoporosis, logistic regression is appropriate. The logistic regression process finds values of constants a, b and c:

$$Y = a + bO + cM \qquad (4)$$

Where Y is the logit function, being the log of the odds-ratio, that is the ratio of the probability of an individual having osteoporosis to the probability of the individual not having osteoporosis.

The logistic regression process takes as input a plurality of triples of the form indicated above and optimises the values of the constants a, b and c so as to provide an optimum fit of the logit function Y to the provided data. The optimisation is carried out as an iterative process.

The coefficients in logistic regression indicate the increase or decrease in the log odds of osteoporosis produced by one unit change in the independent variables (i.e. OSIRIS score and cortical width measurement), controlling for the effects of any other variables in the model. The odds of an event occurring is the ratio of the probability that it will occur to the probability that it will not. In a logistic regression model involving OSIRIS and the cortical width measurements, by increasing the value of the cortical width by 1 mm, the log odds of having osteoporosis (i.e. as given by equation (2)) decreased by 2.11 times and the odds (i.e. as given by equation (1)) by a factor of 0.122, when the other independent variable remains constant. Similarly, by increasing the value of OSIRIS score by 1 unit, the log odds of having osteoporosis decreased by 0.52 times and the odds by a factor of 0.59, provided cortical width remained the same. Using logistic regression with the robust standard error within the statistical software package STATA available from StataCorp LP, Texas, USA, gives rise to similar confidence intervals.

Having described the manner in which the constants a, b and c are determined, and the values of those constants for a model based upon cortical width measurements and OSIRIS score, a method for obtaining an OSIRIS score for a particular patient is now described. The OSIRIS score is a known metric providing an indication of whether a patient is osteoporotic. The OSIRIS score is based upon a patient's age, body weight, current hormone replacement therapy (HRT) use and history of previous low impact fracture. The index is computed according to equation (5):

$$O = \text{floor}(-2 \times A) + \text{floor}(2 \times W) + (2 \times H) - (2 \times L) \qquad (5)$$

where:
O is a scalar value indicating the output of Osteoporosis Index of Risk;
A is a scalar value indicating the age of the patient in years;
W is a scalar value indicating the body weight of the patient in kilograms;
H is a binary value indicating whether or not the patient is undergoing hormone replacement therapy, wherein a value of 0 indicates that the patient is not undergoing hormone replacement therapy and a value of 1 indicates that the patient is undergoing hormone replacement therapy;
L is a binary value indicating whether or not the patient has medical history relating to low trauma bone fractures, wherein a value of 0 indicates that the patient has not had a low trauma bone fracture and a value of 1 indicates that the patient has had a low trauma bone fracture; and
floor is a function rounding its input down to the nearest integer.

The value of O calculated in equation (5) indicates a diagnosis of the patient as follows. A value of O lower than −3 indicates a high risk of low bone mineral density and consequently a high likelihood of osteoporosis. A value of O in the range between −3 and +1 indicates a medium risk of low bone mineral density and consequently a medium likelihood of osteoporosis. A value of O higher than +1 indicates a low risk of low bone mineral density and consequently low likelihood of osteoporosis.

Having described how an OSIRIS score is obtained, a method for obtaining a measurement of width of the patient's lower mandibular cortex is now described.

Figure 3:
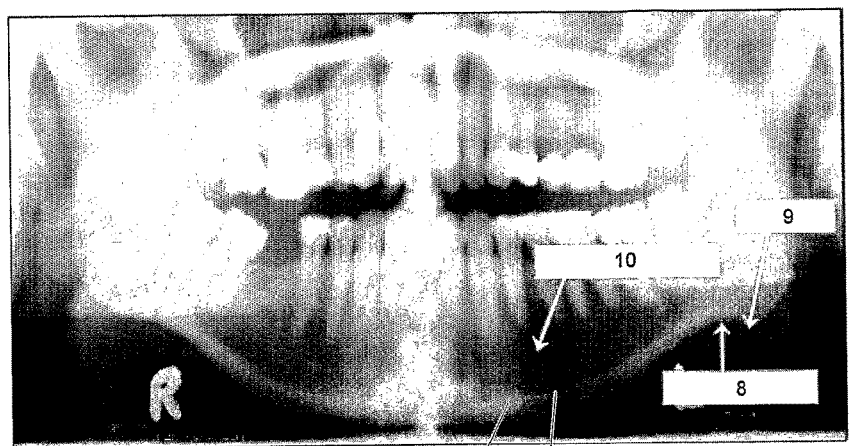
FIG. 3 is a dental panoramic tomogram of a patient.

FIG. 3 is an example panoramic dental tomogram obtained from a sample patient showing the patient's inferior mandibular cortex 7. Such a tomogram maybe obtained using a Cranex DC-3 unit available from Soredex Orion corporation of Finland or a Planmeca PM20002C unit available from Planmeca of Finland. Films obtained may be digitised using a Kodak LS85 digitiser available from Eastern Kodak of Rochester, N.Y., United States at a resolution of 25.64 pixels per millimetre. Alternatively, appropriate images at appropriate resolution may be obtained directly using a digital image acquisition device. A number of anatomical landmarks on the inferior mandibular cortex can be seen. On the left mandible the ante-gonion point 8 and the gonion point 9 are indicated, as is the mental foramen 10. Although not easy to discern in FIG. 3, the position of the mental foramen 10 is determinable by an appropriately skilled dental practitioner. A point on the inferior mandibular cortex which is such that a distance from that point to the mental foramen along a normal to the inferior mandibular cortex at that point is a minimum for all points on the inferior mandibular cortex, is referred to as the mental cortical region and is denoted 11.

Figure 4A:
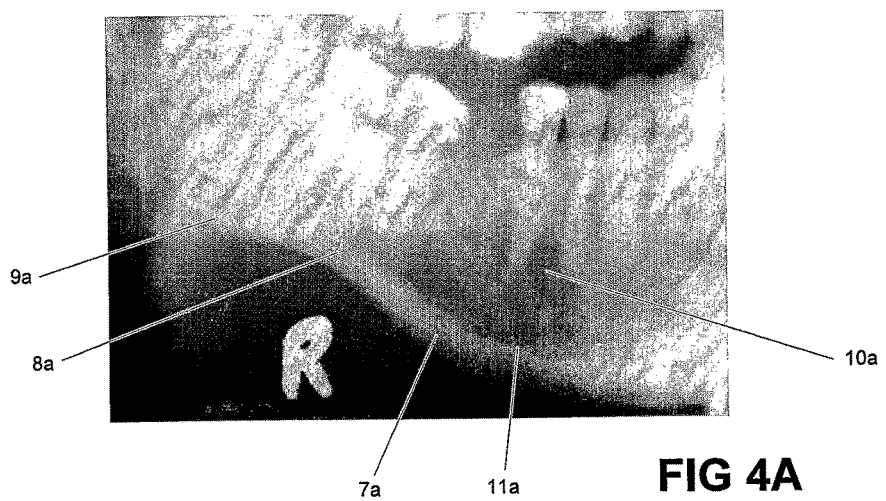
FIG. 4A is a part of the dental panoramic tomogram of FIG. 3 showing features of the right inferior mandibular cortex.
Figure 4B:
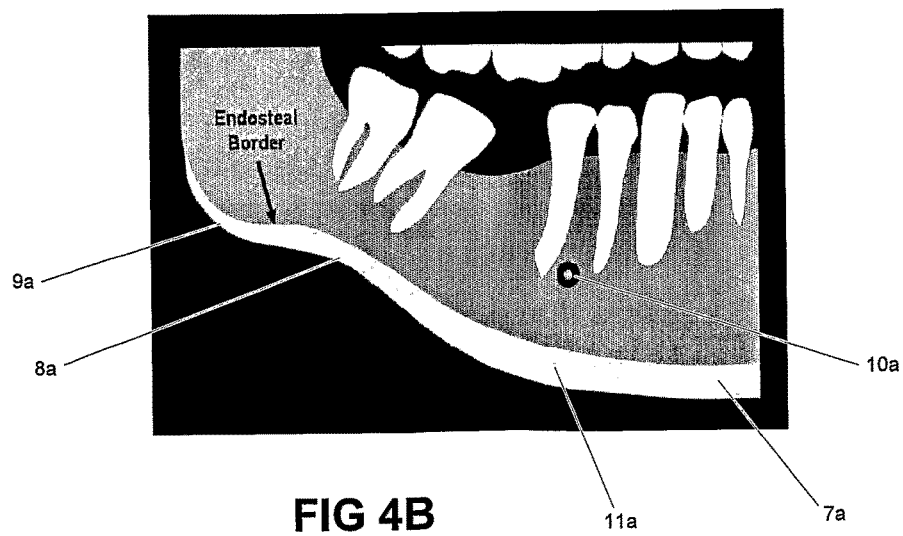
FIG. 4B is a schematic illustration of features visible in the dental panoramic tomogram of FIG. 4A.
Figure 5:
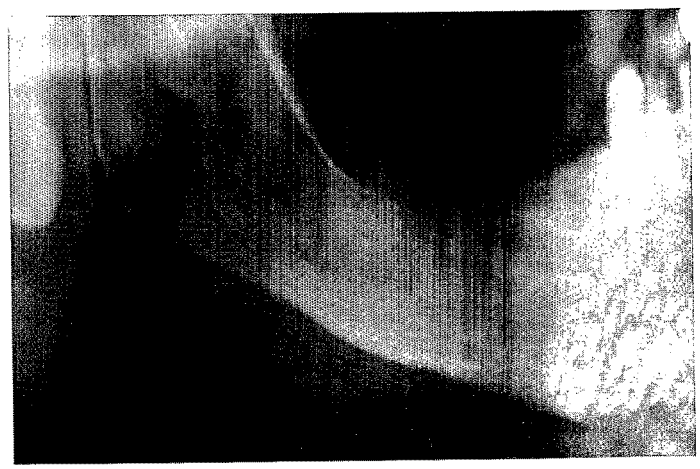
FIG. 5 is a part of a dental panoramic tomogram of a patient having low bone mineral density.

FIG. 4A shows a part of the panoramic dental tomogram of FIG. 3 which was obtained from a healthy patient. The inferior mandibular cortex is indicated 7a with the ante-gonion point indicated 8a and the gonion point indicated 9a. The mental foramen 10a and the mental cortical region 11a are also indicated. FIG. 4B is a schematic illustration in which features of FIG. 4A can be seen more clearly. FIG. 5 shows a part of a panoramic dental tomogram obtained from an osteoporotic patient. It can be seen that in the image of FIG. 5 (as compared with the image of FIG. 4A) the inferior mandibular cortex is thinner, and less well defined. Measurement of the width of the inferior mandibular cortex is now described.

In general terms, the processing now described fits a point distribution model (PDM) to part of a mandible. The model is fitted to a received image, and a distance between particular points of the PDM when fitted to the received image is measured to determine the width of the inferior mandibular cortex. This is now described with reference to the flowchart of FIG. 6.

At step S5 a panoramic dental tomogram is received. At step S6 a previously generated PDM of the lower border of the inferior mandibular cortex is fitted to the received image. The PDM of the lower border of the inferior mandibular cortex as fitted to the received panoramic dental tomogram is used to initialise the fit of a PDM of the upper and lower borders of the of the inferior mandibular cortex at step S7. The PDM of the upper and lower borders of the inferior mandibular cortex is fitted to the received image at step S8. Points within the fitted PDM are located within the image at step S9, and appropriate measurements are taken at step S10.

The PDMs used in the described embodiment are created by manual annotation of training images aligned to a common co-ordinate system. That is, points to be included within the model are marked by a human expert in a plurality of training images. The positions of the upper and lower borders of the inferior mandibular cortex at the mental cortical region and the antegonion are marked. This provides eight points for inclusion in the PDM, four on the left inferior mandibular cortex and four on the right inferior mandibular cortex. A number of equally spaced points are then placed between the mental cortical region and ante-gonion on each of the upper and lower borders of the inferior mandibular cortex, on each of the left and right inferior mandibular cortex. These manually placed points are then used as a basis for interpolation so as to provide a PDM comprising 200 points, 50 on each of the upper and lower borders of the inferior mandibular cortex, on both the left and right inferior mandibular cortex. The PDM therefore provides a partial model of the inferior mandibular cortex extending between the ante-gonion point and mental cortical region on each of the left and right inferior mandibular cortex.

In a preferred embodiment, two human experts each annotate each of the training images, and the annotations of each expert are combined by taking a mean of the marked points. It is this mean that is used as a basis for interpolation.

Each shape annotated in the manner described above is represented by a respective shape vector, comprising a concatenation of the coordinates of the marked points. The shape vector x for a particular marked shape takes the form:

$$x = (x_1, y_1, x_2, y_2, \ldots, x_n, y_n) \qquad (6)$$

A mean shape vector $\bar{x}$ can be calculated according to equation (7):

$$\bar{x} = \frac{1}{N} \sum_{i=1}^{N} x_i \qquad (7)$$

Where N is the number of shapes.

A plurality of shape vectors, one for each training image can be used to generate a matrix X, in which each row represents a shape vector. Each of these shapes is translated, rotated and scaled so that their centroids coincide and the sum of squared differences between the points on each shape and those on the mean shape is minimised. A covariance matrix S can be created from the aligned shapes by first calculating the mean shape vector using equation 7

For each shape in the training set the deviation $dx_i$ from the mean shape can be calculated from equation 8.

$$dx_i = x_i - \bar{x} \qquad (8)$$

The covariance matrix S is then calculated using equation (9).

$$S = \frac{1}{N} \sum_{i=1}^{N} dx_i dx_i^T \qquad (9)$$

The eigenvectors of the matrix S can be determined and a matrix P of the t most significant eigenvectors can be created.

In this way, any shape can be represented according to equation (10):

$$x = \bar{x} + Pb \quad (10)$$

where x is a vector representing the shape of interest;
$\bar{x}$ is a mean shape vector generated from shape vectors of images in the training set (according to equation 7);
P is the matrix of eigenvectors described above; and
b is a t-element vector of weights to be applied to eigenvectors of the matrix P to generate the vector x for the shape of interest.

The components of b ($b_i$, i=1 . . . t) are referred to as shape parameters. The eigenvectors $P_i$ are sorted according to their eigenvalues $\lambda_i$, which describe the observed variance over the training shapes associated with each eigenvector. That is to say the $\lambda_i$ represent the proportions of variance from the mean shape that are described by each of the eigenvectors. By selecting a value of (≤N), the model can be made to represent some chosen proportion (say 95% or 99%) of the total variance observed in the training shapes.

Figure 7:
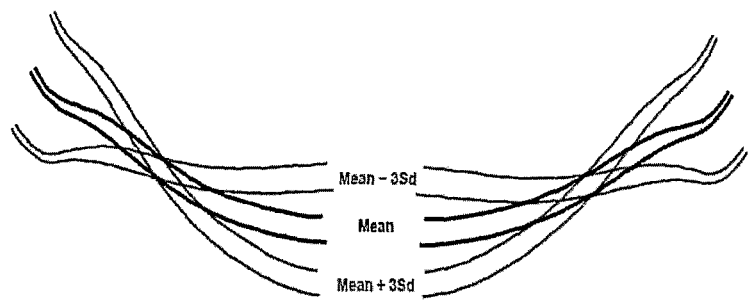
FIG. 7 is a schematic illustration showing modes of variation of a shape model modelling the inferior mandibular cortex.

Each eigenvector included in the matrix P represents a mode of variation of the modelled shape. Varying values of elements of the vector b allows generation of shapes within the range observed within images of the training images. For example, if an element $b_1$ of the vector b is varied by ±3 standard deviations of the mean value found in the training images, modelled mandibular shape varies as shown in FIG. 7. It can be seen that varying the element $b_1$ of the vector b represents a range of mandibular shapes from narrow to broad. Other elements of the vector b represent other characteristics of the modelled shape.

Figure 6:
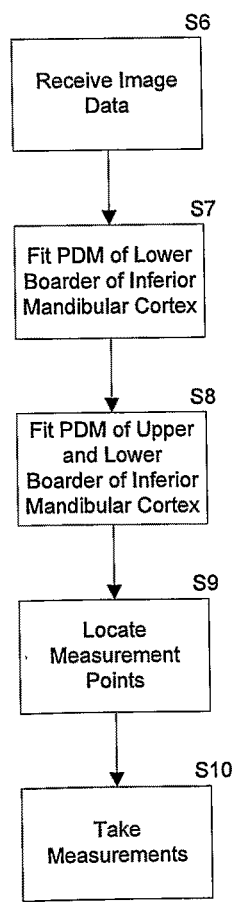
FIG. 6 is a flowchart of a process for obtaining a measurement of inferior mandibular cortex width from a dental panoramic tomogram.

Having described creation of a PDM, the fitting of that PDM to images of interest as outlined with reference to FIG. 6 is now described in further detail. As indicated, the modelled lower border of the inferior mandibular cortex is fitted to an image of interest first (step S7) before a model of the upper and lower borders of the inferior mandibular cortex is fitted to the image of interest (step S8) based upon fitment of the model of the lower border. In fitting PDMs to the image of interest, the PDMs are used as Active Shape Models (ASMs). In general terms, an Active Shape Model is a statistical model of shape, such as a Point Distribution Model (above) which can be iteratively adjusted to fit image data while retaining the shape constraints expressed by the model. ASMs are described in further detail in Cootes, T. F.; Taylor C. J.; Cooper, D. H.; and Graham, J: "Active Shape Models —Their Training and Application" Computer Vision and Image Understanding, vol 61(1) pp 38-59, 1995 the contents of which is incorporated herein by reference.

In general terms, the PDMs are fitted to the image of interest using a process of iterative local refinement. An initial shape is defined by the average shape within the PDM. Sample profiles are then constructed normal to the shape boundary at each modelled point, and the modelled points are allowed to move along the constructed normal. Each point is placed in the image of interest along the normal at a location where the intensity gradient is a maximum (i.e. the location defining the strongest edge). Allowing each modelled point to vary independently will result in the generation of shapes which are not legally defined by the PDM, and it is therefore necessary to limit movement of the points relative to one another. From equation (10) the change in the parameter vector db arising from a change in shape dx is given by equation 11:

$$db = P^T dx \quad (11)$$

Equation (11) provides a constraint on the allowed variation in shape by restricting the modes of variation to those described by the PDM. Further limitation is also required to restrict how far along each normal points are allowed to move. That is, even with the limitation of equation (11) it is still possible to produce shapes which do not resemble sufficiently closely a likely mandible shape. This is achieved by taking appropriate data from the training images. More specifically, considering each shape parameter $b_i$ and its associated eigenvalue $\lambda_i$, it would be expected that the sum of equation (12) should follow a $\chi^2$ distribution.

$$\sum_{i=1}^{t} \frac{b_i^2}{\lambda_i} \quad (12)$$

Thus, by setting a limit on the sum of equation (12), using the area under the $\chi^2$ distribution the desired proportion of variance observed in the training set can be retained for images to which the model is fitted.

As indicated, the values of the vector b are modified iteratively until a distribution of points considered to be sufficiently accurate is determined. Iterative modification typically ends when changes in positions between subsequent iterations are sufficiently small. It has been found that ten iterations were sufficient to reduce changes in point position to approximately 0.2 pixels or 0.026 mm.

Images of the type described above typically include a number of artefacts which make model fitting difficult. Accordingly, in some embodiments of the invention robust estimation of the vector b can provide improved results as discussed in Rogers, M; and Graham, J: "Robust Active Shape Model Search" ECCV 2002, LNCS 2353, pp 517-530, 2002, the contents of which is herein incorporated by reference. Robust parameter optimisation is concerned with minimising the difference between a shape defined by a parameterisation of the model, and that included in an image of interest. That is, residuals defined by equation (13) are minimised:

$$r = (x - x_0) \quad (13)$$

where r is a vector of residual values;
$x_0$ is a shape currently defined by the model; and
x is a shape included in the image of interest.

Elements $r_i$ of the vector r are summed such that values $r_i$ providing the lowest sum are preferred. In the sum, elements $r_i$ are allocated weights $w_i$ based upon standard deviation of the values of $r_i$ in the training set. Weights $w_i$ are determined by equation (14):

$$w_i = \begin{cases} 1 & r_i < \sigma \\ \sigma/|r_i| & \sigma \leq r_i < 3\sigma \\ 0 & r_i \geq 3\sigma \end{cases} \quad (14)$$

Minimisation of the sum of residuals is used to generate a vector b which represents the shape included in the image of interest.

The preceding description has explained how a model defining both upper and lower borders of the inferior mandibular cortex can be fitted to an image of interest. In order to obtain a measurement of cortical width, a pair of points (one on the upper border and one on the lower border) between which a measurement is to be taken are selected. In a preferred embodiment of the invention a plurality of pairs of points are selected, a plurality of measurements, one for each pair of points is obtained, and a mean of the measurements determined. Such an approach improves accuracy. It has been discovered that taking such measurements between ten pairs of points located between the ante-gonion point and mental cortical region provides acceptable results.

It has been explained above that the model provides fifty equally spaced points between the ante-gonion point and the mental cortical region. Taking ten measurements from successive pairs of points beginning with the tenth pair from the ante-gonion point has been found to provide good results.

Figure 8:
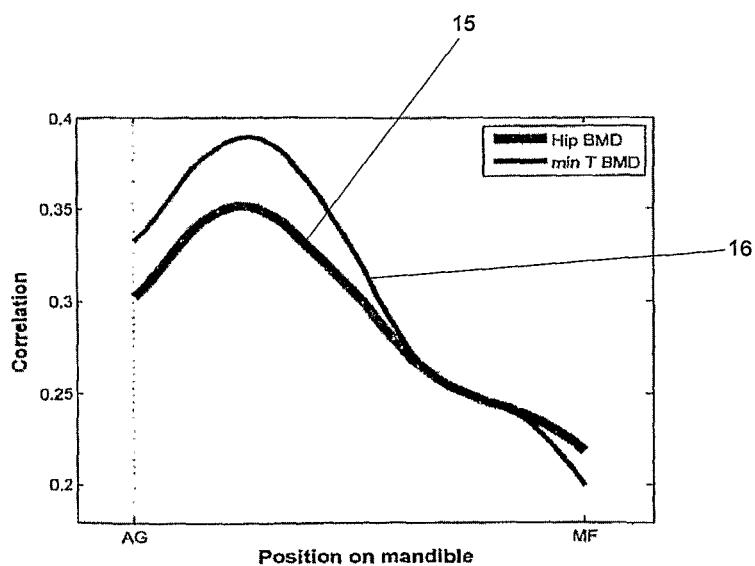
FIG. 8 is a graph showing variance in correlation between cortical width measurement and bone mineral density, depending upon the location at which cortical width is measured.

FIG. 8 is a graph showing how correlation between cortical width measurement and bone mineral density varies, depending upon the location at which the cortical width measurement is taken. Bone mineral density values used to generate the data shown in FIG. 8 were obtained from dual-energy X-ray absoptiometry (DXA). A first line 15 shows values for bone mineral density obtained from DXA at a patient's hip. A second line 16 shows values for bone mineral density obtained from DXA at a number of sites, the minimum obtained value being used to generate values represented by the second line 16.

It can be seen from FIG. 8 that highest correlation between cortical width measurement and true low bone mineral density occurs at a location approximately 25% of the distance between the ante-gonion point and the mental cortical region. It is for this reason that measurements are taken between pairs of points indicated above.

Having described how PDMs are fitted to images of interest, and how measurements of cortical width are subsequently generated, experimental results obtained using the methods described above are now presented. First, the effectiveness of fitting PDMs of the type described to images of interest in the manner described is discussed.

Two approaches to fitting a PDM of the lower border of the inferior mandibular cortex have been used in experiments. A first approach used an unconstrained free search in which a PDM operating as an ASM attempted to correctly locate the lower border of the inferior mandibular cortex. The ASM was initialised such that points were located as for the mean shape $\bar{x}$. For some images of interest the shape of the lower border of the inferior mandibular cortex in the image is quite different from the mean shape, and accordingly a coarse to fine search strategy of the type described in Cootes et al (supra) was employed. The result of fitting the ASM of the lower border of the inferior mandibular cortex was then used to initialise a search for best fit of an ASM defining both upper and lower borders of the inferior mandibular cortex. This initialisation was based upon the mean shape defined by the ASM including both upper and lower borders of the inferior mandibular cortex and warping the mean example of this ASM so that the points on the lower border of the inferior mandibular cortex are coincident with the points of the ASM for the lower border of the inferior mandibular cortex, as applied to the image of interest.

Figure 9:
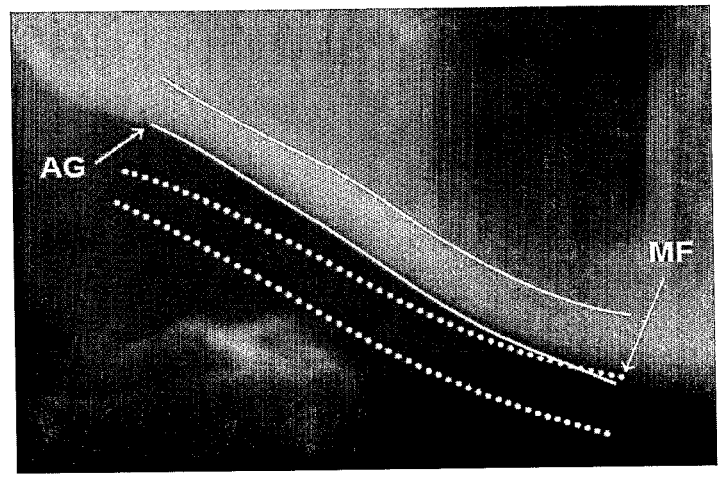
FIG. 9 is an image showing a model and final model placement after a model filtering process.

FIG. 9 shows the model before placement within the image in broken lines, with the placement of the model after search shown in solid lines.

An alternative approach to fitting a PDM operating as an ASM to an image of interest involved manually defining the ante-gonion point and the mental cortical region on the lower border of both left and right mandibles. The mean shape defined by the PDM of the lower border of the inferior mandibular cortex was then stretched and positioned so as to be aligned with the marked ante-gonion and mental cortical region points. A search to obtain a best fit for the ASM of the lower mandibular cortex was then carried out, and the result of that search used to initialise a search for best fit of the ASM including upper and lower borders of the inferior mandibular cortex. It should be noted that the manually placed points played no part in the search—these points were merely used to set the initial position of the lower border of the inferior mandibular cortex within the image of interest.

Figure 10:
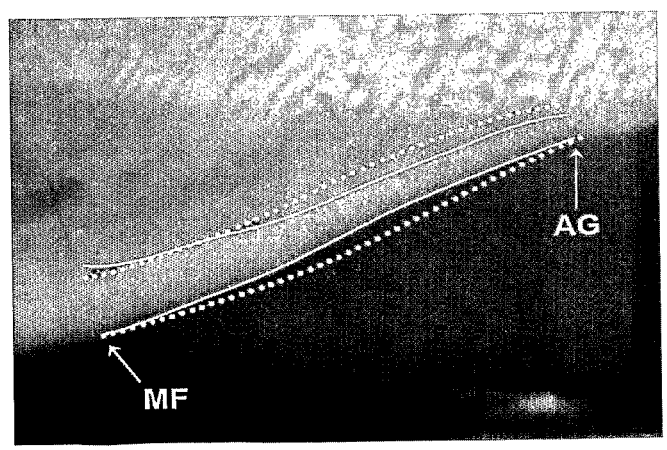
FIG. 10 is an image showing a model and final model placement after a model filtering process, where an alternative model fitting process is used.

FIG. 10 shows initial placement of an ASM defining both upper and lower borders of the inferior mandibular cortex is broken lines, with the position after search being shown in solid lines.

In any ASM search a number of parameters need to be set such as sample profile length, degree of PDM shape constraint (defined by the sum of equation (12)) number of resolution levels, and so on. In the experiments carried out, these parameters were determined empirically.

As described above, an instance of the Point Distribution Model (PDM) is essentially a set of points defining the boundary of a shape. The ASM method starts with an instance of the mean shape at a start position. At each point on the start shape, a search is made along a line perpendicular to the shape border at that point for the best candidate location to move that point to in the next iteration of the search. In this particular implementation the best location is defined as the position of maximum gradient—the direction of the gradient depending on whether it is the upper or lower mandibular border that is being sought.

The distance along the perpendicular included in this search is known as the 'Profile Length' and there is a 'Profile In', the part of the perpendicular inside the shape boundary, and a 'Profile Out', the part of the perpendicular outside the shape boundary. In this implementation both the 'Profile In', and the 'Profile Out' are set at 15 pixels, which at a working resolution of 7.69 pixels/mm translates as 1.95 mm.

The ASM method can use a 'Multi Resolution' search method starting from a course resolution down through a set of resolution levels finally to full resolution. At each level the search is initialised from the results of the last level and the search profile lengths are set to the same number of pixels at each level. This means that the profile lengths in appropriate units (for example mm) effectively get smaller as the search progresses through the resolution levels.

Starting from full resolution, the image resolution is progressively halved to form a 'pyramid'—and the number of levels in the pyramid is an ASM search parameter.

For the fully automatic model fit, multi resolution search was used to locate the bottom (inferior) border of the mandibular cortex and the number of levels was 4. For the second stage of the search to fit the full mandibular cortex model multi-resolution search was not used.

It was found that where no-manual identification of the ante-gonion point and mental cortical region was carried out (the first unconstrained method outlined above) a shape constraint of 99% was required to provide sufficient flexibility to accommodate variation in shapes while retaining sufficient shape constraint to avoid unfeasible matches arising from spurious edge features close to the mandible. However for full resolution fitting of the complete mandibular cortex model using either of the approaches outlined above a constraint of 100% was necessary for the model to be able to describe the fine detail of the upper border of the inferior mandibular cortex accurately and give the best sensitivity to bone mineral density. This is effectively a removal of model parameter constraint since the tail of the $\chi^2$ distribution goes on to infinity, however this still restricts the shapes to those possible along the axes of variation within the PDM. This high degree of model flexibility was possible since the search based upon the ASM including both upper and lower borders of the inferior mandibular cortex started very close to the correct position (given that it was based upon the fit of the model determining the lower border of the inferior mandibular cortex), and so only the mandibular cortical edges would be within reach of the model's search profiles.

Resolution of images used for the purposes of the described experiments should also be considered. The panoramic dental tomograms were scanned from film at a resolution of 25.64 pixels/mm. At this resolution the film grain is visible, contributing a source of noise in the images which was found to interfere with ASM search. To overcome this a degree of smoothing was necessary. Dental panoramic radiography in digital format is becoming increasingly used. Such digital images typically have a resolution of 8.8 pixels/mm. It is therefore appropriate to evaluate the effectiveness of the method for segmenting images at the current digital resolution. Experiments over a range of subsampled resolutions on the data set showed that reducing the resolution, by Gaussian smoothing and sub-sampling, to that of the digital radiographs had little effect on the model fit accuracy as measured by the point-to-point difference, and no effect on the sensitivity to reduced bone mineral density indicated by ROC analysis (described below). Therefore the results discussed herein are based upon a 30% reduced resolution of 7.69 pixels/mm, which is approximately equivalent to digital radiographs.

In common with many studies in medical image analysis, "accuracy" from the point of view of model fitment is defined to mean conformity with expert medical annotation. To compare the model fits with the manual annotation mean point-to-point, and mean point-to curve difference between the manually placed points and those resulting from the model fit are used in order to estimate the accuracy of the model fit. Since the goal is to measure mandibular cortical thickness, measurements of cortical thickness derived from model fits with those from manual annotation are also compared. The thickness is measured as the distance between corresponding points on the lower and upper border of the inferior mandibular cortex. The comparison is achieved using a Bland and Altman plot in which the difference between two sets of measurements are plotted against their mean. From this analysis the bias is measured as the mean difference between the two sets of measurements, and the limits of agreement are the mean difference+/−1.96 standard deviations. Ultimately it is desired to determine the sensitivity of the derived measurements to osteoporosis and this is done by calculating a correlation coefficient between the parameter in question and bone mineral density (for example as obtained from MCA data), and by plotting a Receiver Operator Characteristic (ROC) curve. The area under the ROC curve can be used to quantify the overall diagnostic efficacy of the parameter in question—ranging from 0.5 (no better than chance) to 1.0 (perfect discrimination).

Table 1 shows comparisons in terms of point differences and cortical width measurements. Data is shown comparing annotations of the two human experts (in rows indicated Manual 1-2), comparing the mean human annotation with uninitialised model fit (in rows indicated Manual-UFit), comparing the mean human annotation with model fit based upon human placed antegonion point and mental cortical region (in rows indicated Manaul-4 PFit), and comparing the fits obtained where the antegonion point and mental cortical region are initialized by two different human experts (in rows indicated Fit1-Fit2). Mean values are shown in each cell of the table, with standard deviation values being shown in parentheses. Rows indicated AG-MF show data relating to an area between the ante-gonion point and the mental cortical region, while rows indicated MF show data relating to the mental cortical region.

TABLE 1

| Comparison | Region | Point difference (mm) | | Cortical Thickness (mm) | | |
| --- | --- | --- | --- | --- | --- | --- |
| | | point-to-point | point-to-curve | bias | Lower lim | Upper lim |
| Manual 1-2 | AG-MF | 2.45 (2.45) | 0.31 (0.33) | −0.02 | −0.77 | 0.72 |
| Manual 1-2 | MF | 2.19 (3.00) | 0.38 (0.38) | 0.13 | −1.09 | 1.36 |
| Manual-Ufit | AG-MF | 5.73 (4.57) | 0.49 (1.58) | −0.30 | −1.01 | 0.40 |
| Manual-4PFit | AG-MF | 0.59 (0.54) | 0.31 (0.40) | −0.25 | −0.79 | 0.28 |
| Manual-4PFit | MF | 0.71 (0.70) | 0.45 (0.56) | −0.31 | −2.03 | 1.41 |
| Fit 1-Fit 2 | AG-MF | 2.31 (2.44) | 0.14 (0.24) | −0.04 | −0.21 | 0.29 |
| Fit 1-Fit 2 | MF | 2.23 (2.99) | 0.27 (0.41) | −0.08 | −1.32 | 1.16 |

Figure 11:
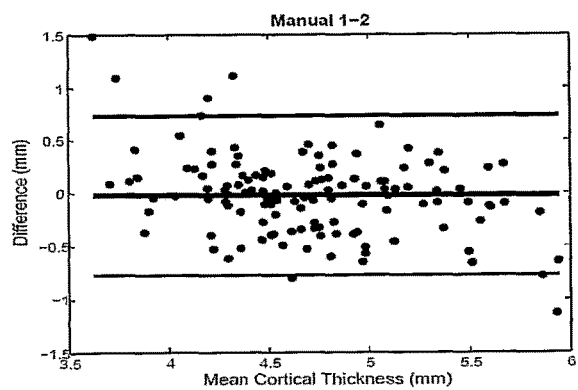
FIG. 11 is a Bland and Altman plot showing differences in cortical width measurement performed by two human experts.

Each of the above comparisons were made for the whole region of the mandible annotated, (i.e. the region between the ante-gonion point and the mental cortical region), and separately for the mental cortical region, as these are the points used in manual measurement. The point-to-point and point-to-curve differences are presented as 'mean value (standard deviation)'. For comparison of cortical width measurements using the Bland-Altman plots, the bias is the mean of the differences between the two sets of measurements being compared, and the limits of agreement are the mean difference+/−1.96 standard deviations. As an example FIG. 11 shows the Bland-Altman plot for comparison between points marked by two human experts.

Figure 12:
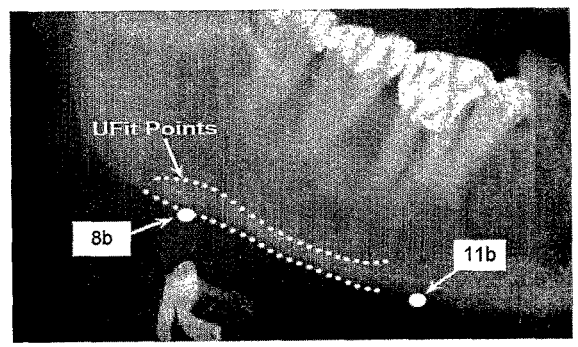
FIGS. 12 and 13 are images showing shape model fit to an image of interest based upon different search strategies.

For the Manual-UFit comparison, the point-to-point differences are large—more than twice those of the manual interobserver reliability. This is because the unconstrained fits are able to locate the upper and lower borders of the mandible correctly, but may result in lateral errors along the upper and lower borders. Because the mandible exhibits a strong grey-level edge along its lower border, there is strong evidence in the image for the position of a point orthogonal to the mandibular edge, but there are no features such as edges to characterise a particular point's position along the edge of the mandible, i.e. its correct mediolateral position with respect to the antegonion point and mental cortical region landmarks. This is borne out in the difference between point-to-point and point-to-curve differences when comparing manual annotations. This means that once the lower mandible ASM has adhered to the mandible edge, there is no motivation in the search mechanism to move the model instantiation mediolaterally along the mandible or to alter its scale. This suggests that an unconstrained ASM fit will accurately measure a portion of the cortical thickness, but that the exact anatomical region of the mandibular cortex that is being measured cannot be guaranteed. This is demonstrated in FIG. 12 where the results of an unconstrained fit are shown against the target image, along with the user defined ante-gonion point 8b and mental cortical region 11b. The upper and lower borders of the inferior mandibular cortex have been correctly located, but the points are displaced laterally with respect to the ante-gonion point and the mental cortical region.

Figure 13:
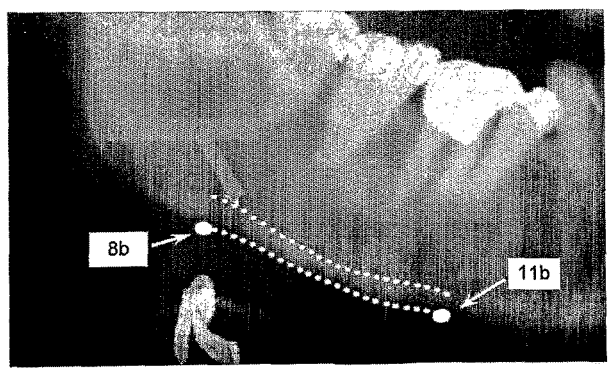

FIG. 13 shows an equivalent image for a fit following human annotation of the ante-gonion point and the mental cortical region. Here anatomical correspondence is, in practical terms, ensured by human indication of the ante-gonion point and the mental cortical region. Thus the point-to-curve differences and bias and limits of agreement for the region between the ante-gonion point and the mental cortical region are only slightly higher than those of the Manual-Fit and the Manual 1-2, but the search result is more accurate than the point-to-point differences would suggest. Because the location along the mandible edge cannot be guaranteed in the unconstrained fit, the results for the mental cortical region are of little meaning and so are not included in this case.

For the Manual-4 PFit, the point-to-point differences are much lower than inter-observer (Manual 1-2) equivalent. This is because between two observers there is much greater subjectivity in the position of the points along the mandibular border than there is in their distance from the border. Hence the point-to-curve differences for Manual 1-2 are much lower than the point-to-point differences, and are comparable with those of the Manual-4 PFit.

For the Manual-4 PFit comparison, the bias in the cortical thickness measurement is larger than the manual inter-observer bias suggesting a systematic difference between the maximum grey-level gradient, and the edge perceived by the human observers. For the region between the ante-gonion point and the mental cortical region the limits of agreement are slightly lower than the Manual 1-2, but considerably larger for the mental cortical region points. Closer inspection of the model fits suggests these larger limits of agreement are due to poor ASM location of the upper mental points, most probably due to image noise in this region caused by the shadow of the spine.

For the Fit1-Fit2 comparison, the point-to-point differences are similar to those of the Manual 1-2 comparison since subjectivity in point position along the mandibular border has been reintroduced by the use of two sets of initialisation points. However the point-to-curve difference and the bias and limits of agreement for the region between the antegonion and mental cortical region are much lower than for other comparisons.

Table 2 shows correlation coefficients (Pearson's) between the cortical width measurements and the bone mineral density values for the hip, spine, and the minimum bone mineral density values (T-score) of the two sites, the bone mineral density values being determined using DXA as described above. Figures in bold exceed the p=0.05 threshold, and figures with a '*' exceed the p=0.01 threshold. None of the cortical thickness measurements derived from the mental cortical region points show significant correlation, whereas measurements obtained in the region between the ante-gonion point and the mental cortical region do show such correlation. For the hip and spine bone mineral density values the human initialized fit performs better than the manual measurements, or the unconstrained fit measurements.

TABLE 2

| Parameter | Spine BMD | | Hip BMD | | Min T-score | |
|---|---|---|---|---|---|---|
| | r | p | r | p | r | p |
| Ufit | 0.21* | 0.009 | 0.19 | 0.016 | 0.24* | 0.003 |
| Manual AG-MF | 0.21* | 0.009 | 0.19 | 0.016 | 0.24* | 0.003 |
| Manual MF | 0.08 | 0.187 | 0.13 | 0.073 | 0.13 | 0.073 |
| 4Pfit AG-MF | 0.23* | 0.005 | 0.25* | 0.002 | 0.27* | 0.001 |
| 4Pfit MF | 0.1 | 0.133 | 0.09 | 0.158 | 0.11 | 0.110 |

A useful metric when considering the efficacy of a diagnostic test is the receiver operating characteristic (ROC). This metric acknowledges that any test will provide false negative results and false positive results and takes such results into account in a determination of efficacy. The sensitivity of a test is defined by the number of positive results provided by the test divided by the total number of positive samples within the dataset (i.e. the true positive results provided by the test, together with the false negative results provided by the test). The specificity of a test is defined by the number of negative results provided by the test divided by the total number of negative samples within the dataset (i.e. the true negative results provided by the test, together with the false positive results provided by the test). The ROC provides a curve of the general form shown in FIG. 14 in which sensitivity is plotted against 100-specifitcy (assuming that specificity is defined as a percentage), as a threshold value to determine positive or negative test output is varied.

Figure 14:
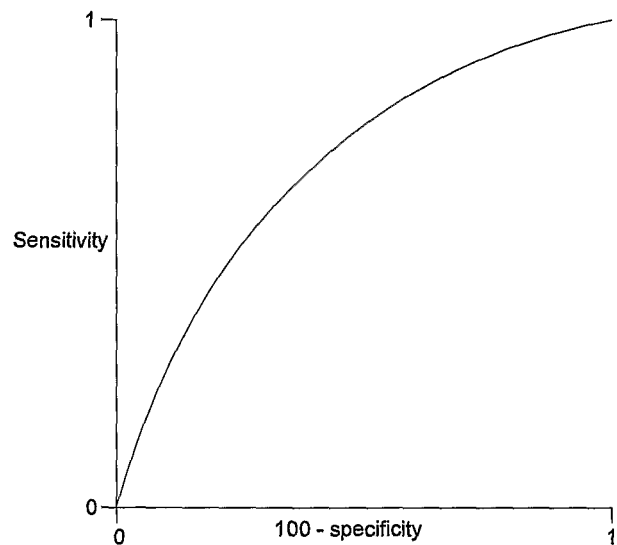
FIG. 14 is a general plot of a receiver operating characteristic (ROC) curve.

It will be appreciated from the above definitions of sensitivity and specificity that an optimal test will be defined by a point in the graph of FIG. 14 having co-ordinates (0,1). Such a point is not usually attainable such that a compromise between specificity and sensitivity is required when determining an appropriate threshold. The area under the ROC curve is known to be a good indicator the efficacy of a diagnostic test, a test providing an ROC curve having a larger area under the curve being considered a better test.

Figure 15:
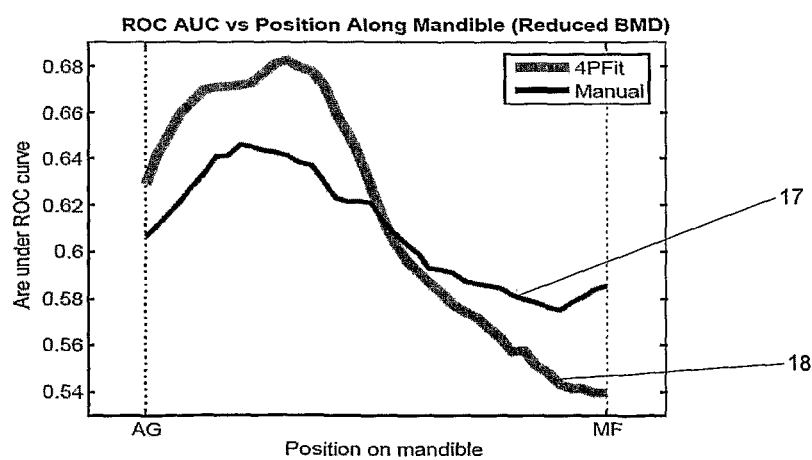
FIG. 15 is a graph showing how area under the ROC curve varies for tests based upon cortical width measured at varying locations.

FIG. 15 shows a graph in which the position of the mandible at which cortical width measurement is taken is plotted against the area under the ROC curve for a test based upon such measurement. A first line 17 shows results for manual measurement, while a second line 18 shows results obtained using an ASM search with a human initialised ante-gonion point and mental cortical region. It can be seen that better correlation between lower bone mineral density and cortical width is achieved where a human initialised ASM search is employed.

Figure 16:
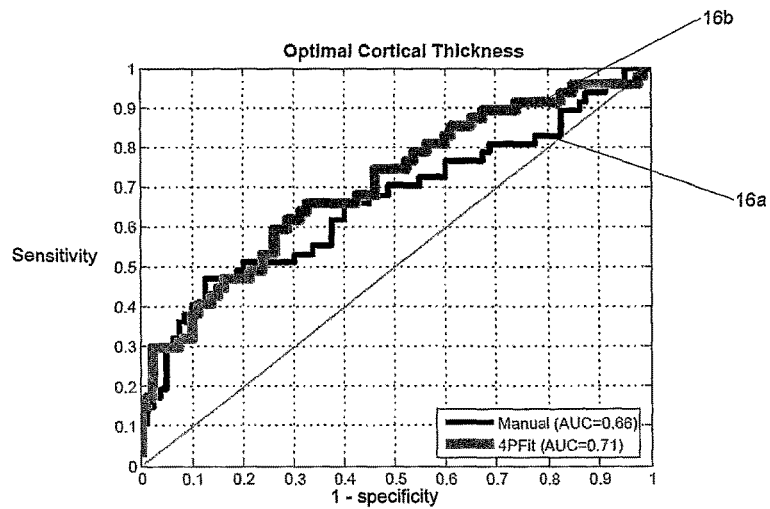
FIGS. 16 to 18 are ROC curves of various tests based upon cortical width measurement.
Figure 17:
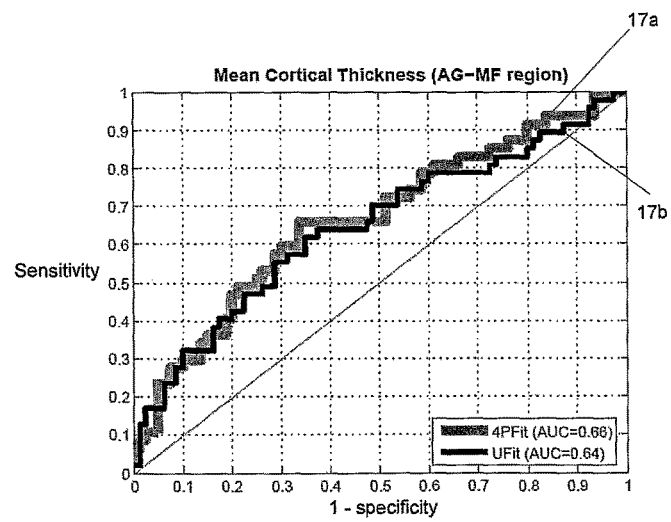
Figure 18:
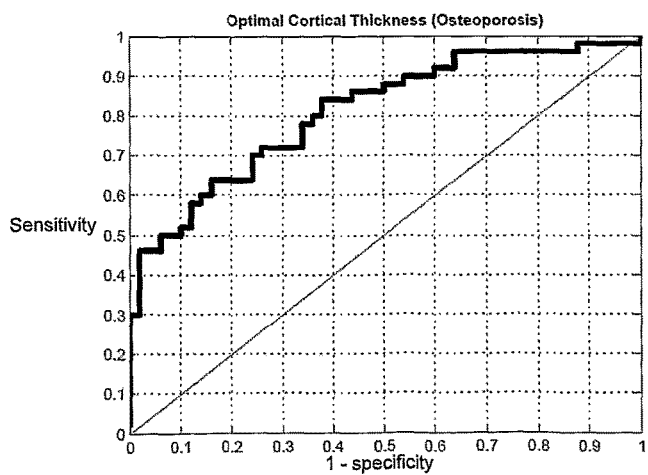

FIGS. 16 to 18 show ROC curves based upon cortical width measurement. The curves of FIG. 16 show measurements obtained from a test to determine low bone mineral density from cortical width measurement. A first curve 16a shows the results obtained from manual measurement, while a second curve 16b shows results obtained from the manually initialised model based method described above. The curves of FIG. 17 again show measurements obtained from a test to determine a diagnosis of low bone mineral density. Here a first curve 17a shows results obtained from the manually initialised model based method described above. A second curve 17b shows results obtained from a fully automated model fit approach as described above. The curve of FIG. 18 shows measurements from a test to determine a diagnosis of osteoporosis. The curves of FIGS. 16 and 17 are based upon data from 132 individuals while the curve of FIG. 18 is based upon data from 100 individuals. The curves of FIGS. 16 to 18 generally show that measurement of cortical width is an effective indication of each of low bone mineral density, osteoporosis.

Figure 19:
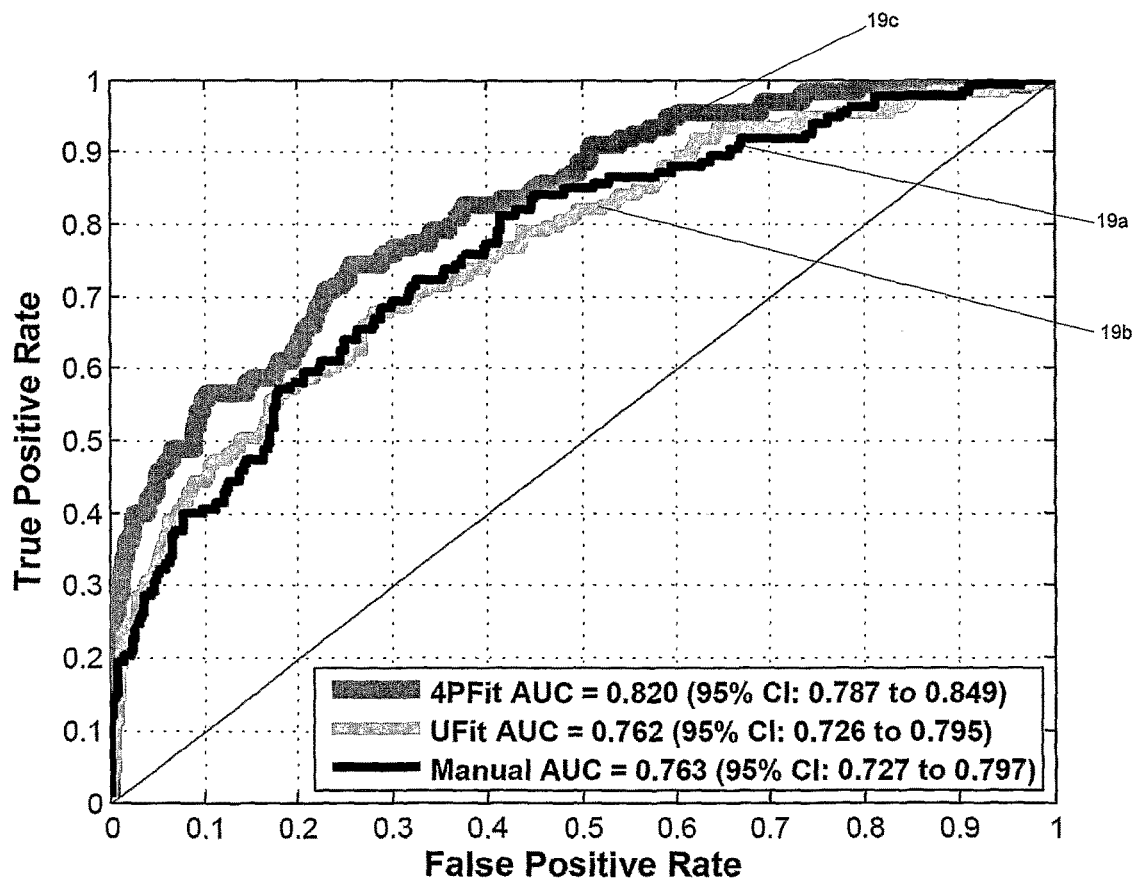
FIG. 19 shows ROC curves of a test based upon cortical width measurement for different methods of measuring cortical width.

FIG. 19 shows ROC curves based upon cortical width measurement. The curves of FIG. 19 show measurements obtained from a test to determine osteoporosis from cortical width measurement. Three curves are shown. A first curve 19a shows results obtained when cortical width measurement was measured manually, a second curve 19b shows results obtained when the cortical width was based upon an unconstrained model fit of the type described above, while a third curve 19c shows results obtained from measurements based upon a manually initialised model fit of the type described above. The curves of FIG. 19 are based upon data obtained from 606 patients. The results of FIG. 19 are therefore more representative than those of FIGS. 16 to 18 and again show that a test based upon cortical width measurement is an effective indicator of osteoporosis. It can also be seen that the human initialised model fit represented by the third curve 19c generally offers better performance than cortical width measurement measured manually, as shown by the curve 19a in FIG. 19.

Referring back to FIG. 1 and its associated description, it will be recalled that a probability calculation based upon equation (1) is carried out taking into account both cortical width measurement and OSIRIS score. The determination of both cortical width measurement and OSIRIS score has been described above. The efficacy of cortical width measurement alone as an indicator of low bone mineral density has also been discussed with reference to experimental results.

Figure 20:
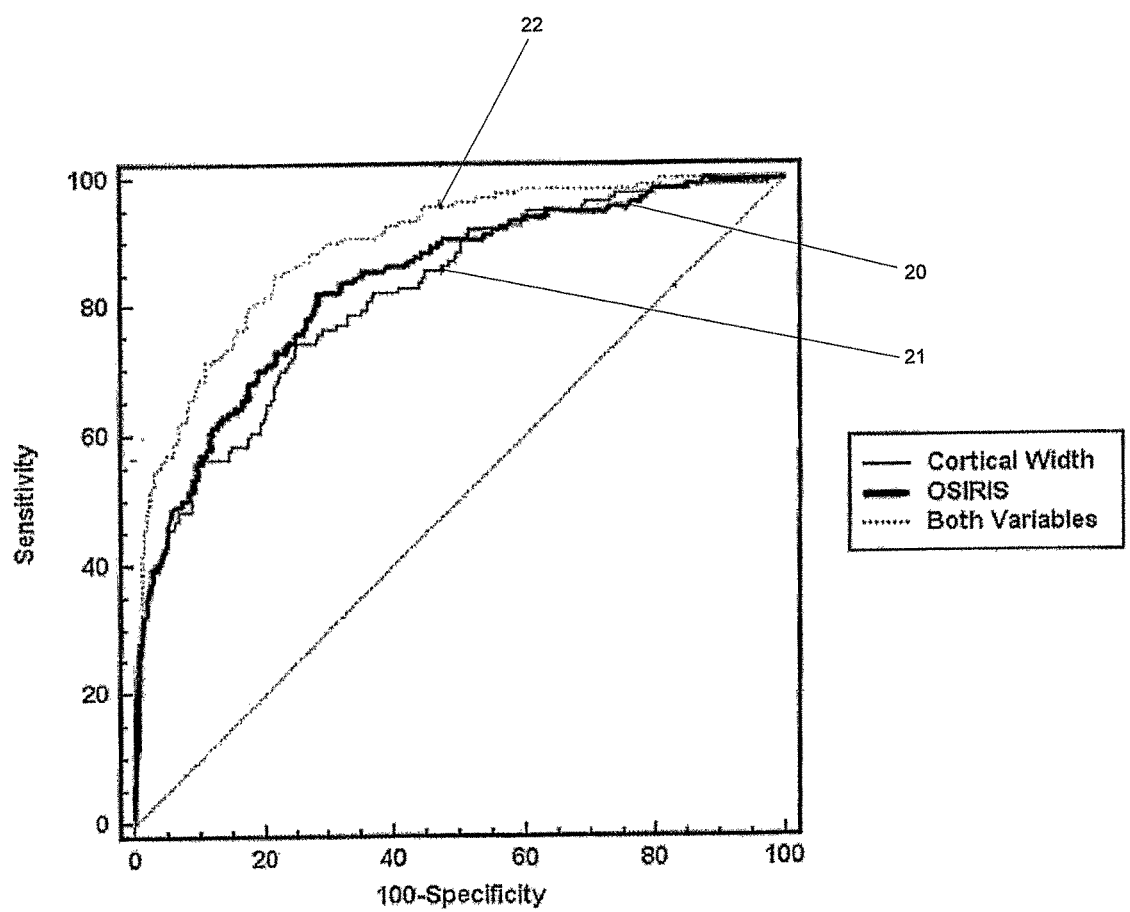
FIG. 20 is a graph showing ROC curves for three tests for osteoporosis.

FIG. 20 shows three ROC curves for three tests used to diagnose osteoporosis. A first curve 20 represents a test based upon OSIRIS score alone. A second curve 21 represents a test based upon cortical width alone. A third curve 22 represents a test based upon a combination of OSIRIS score and cortical width as described above.

The area under the curve 20 representing the test based upon for OSIRIS score alone was 0.84 (95% CI=0.81 to 0.87). The area under the curve 21 representing the test based upon cortical width measurement alone was 0.82 (95% CI 0.79 to 0.85). The difference between the areas under the ROC curves 20, 21 areas was 0.021, which was not significantly different (95% CI=−0.022 to 0.064), p=0.335.

The numbers in brackets represent the confidence interval (CI). The width of the confidence interval gives some indication of certainty about the location of the "true" mean (or other parameter in question). Thus if the parameter was repeatedly calculated from a randomly chosen data sample, a proportion p of the measured values (usually stated as 95%) would contain the population parameter.

The area under the ROC curve 22 representing the predicted probability based upon equation (1) above was 0.90 (95% CI=0.87 to 0.92). There was a significant improvement in the diagnostic ability of the combined OSIRIS and cortical width test over both tests applied separately (p<0.001).

Using the combined OSIRIS and cortical width data, an "Osteodent Index" was calculated giving the risk of osteoporosis. An operating point on the ROC curve with a specificity value of 90% (95% CI=87.3 to 92.7) and corresponding value of sensitivity of 69% (95% CI=60.2 to 76.1) was selected. By using a high specificity value, at the expense of sensitivity, the minimum number of patients would be sent for unnecessary further investigations. Using this criterion value gave a test with a positive likelihood ratio of 7.02 and negative likelihood ratio of 0.35. The diagnostic odds ratio, the ratio of positive likelihood ratio divided by negative likelihood ratio, was 20.06.

Figure 21:
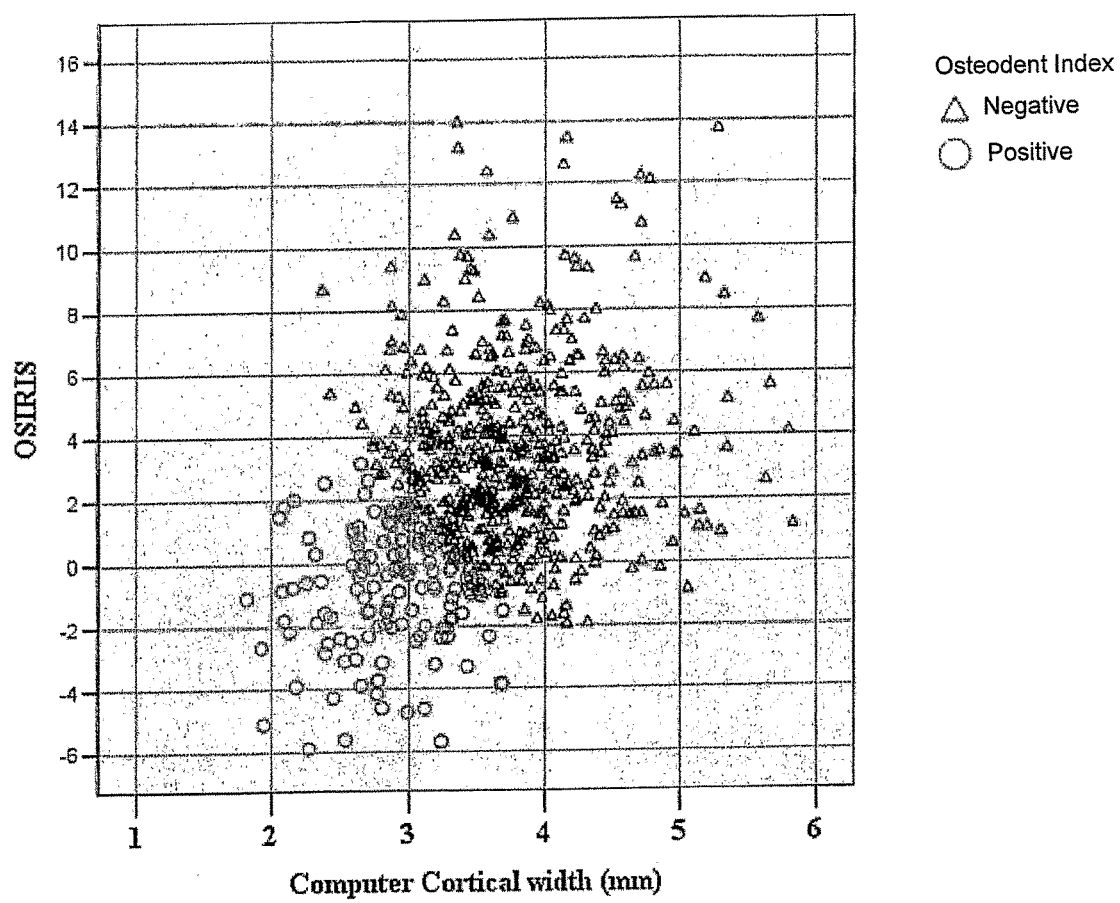
FIG. 21 is a scatter plot showing predictions of osteoporosis and associated values of variables indicative of osteoporosis.

The OSIRIS values were plotted against cortical width for the sample of 652 patients. Using the 90% specificity threshold for the combined variable, the sample was divided into those predicted as being at either high or low risk of osteoporosis. FIG. 21 shows a scatterplot of OSIRIS index and cortical width, with assignment to either high or low risk of osteoporosis based upon the Osteodent Index defined above.

It has previously been suggested that when predicting osteoporosis based upon cortical width measurement alone, the optimal decision boundary of whether to further refer patients lies at a 3 mm cortical width. FIG. 21 shows that in a patient with a 3 mm cortical width, only when the OSIRIS value is greater than 1.83 is referral not indicated by the Osteodent Index.

Figure 22:
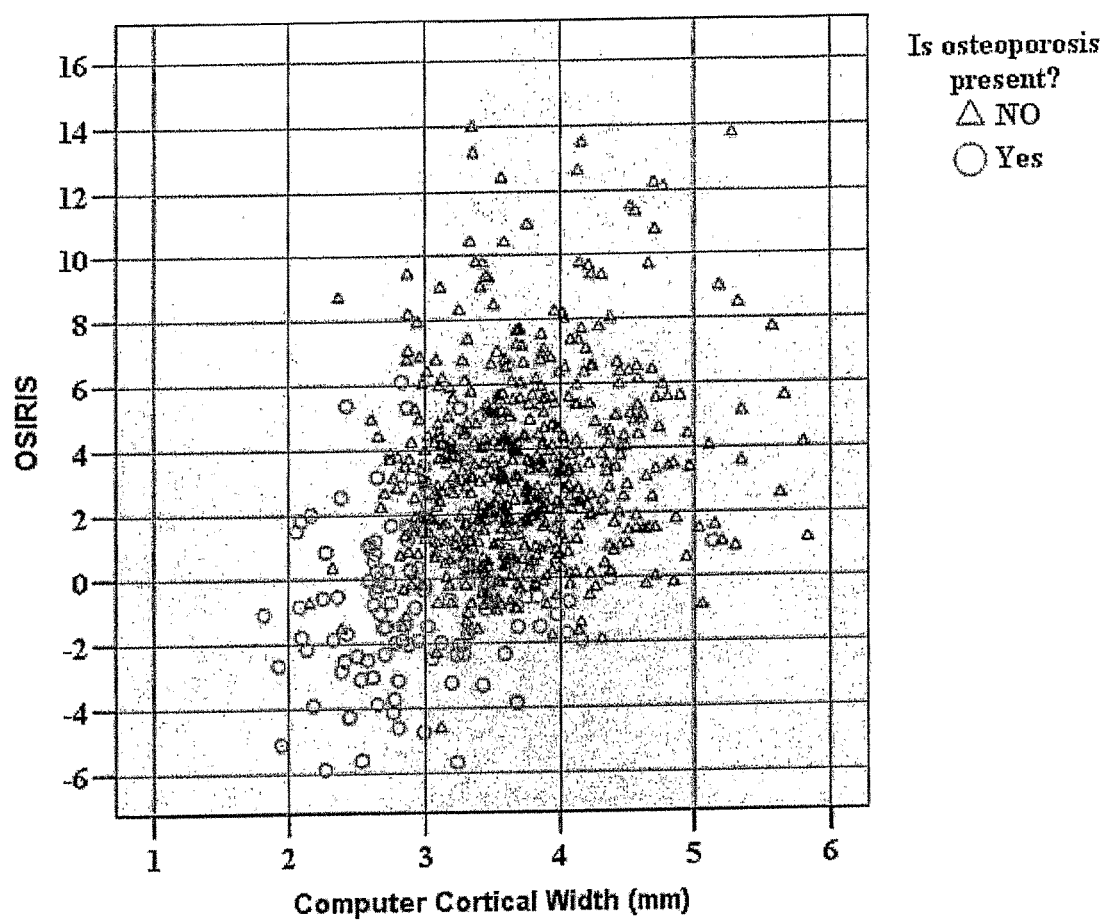
FIG. 22 is a scatter plot showing presence of osteoporosis and associated values of variables indicative of osteoporosis.

There is some overlap of osteoporotic and non-osteoporotic combined OSIRIS and cortical width values, as can be seen from a scatterplot shown in FIG. 22. Those patients with osteoporosis tend to be grouped towards the lower values of both parameters.

Table 3 shows the false positive and false negative assignments arising from a referral decision at 90% sensitivity (95% CI=83.8 to 94.4) for the combined cortical width and OSIRIS data. The corresponding sensitivity was 68.8% (95% CI=63.7 to 72.0) and the diagnostic odds ratio was 18.73. While using a high sensitivity ensures that only 10% of osteoporotic patients would fail to be referred for further investigation, 56.6% of those referred would have a normal BMD. Such a strategy involves relatively high costs for a state operated health service, given that a relatively large number of healthy individuals undergo unnecessary tests.

TABLE 3

|  | No referral for DXA | Refer for DXA | Total |
|---|---|---|---|
| Osteoporosis present | 14 (2.1%) | 126 (19.3%) | 140 |
| Osteoporosis absent | 348 (53.4%) | 164 (25.2%) | 512 |
| Total | 362 (55.5%) | 290 (44.5%) | 652 |

An alternative decision strategy is to adopt a high specificity operating point, Table 4.

Using a threshold of 90% specificity, results in a referral of only 50 (10%) of those with a normal BMD, but with the disadvantage that 44 out of the 140 osteoporotic patients (31.4%) would be missed. This would reduce costs of testing.

TABLE 4

|  | No referral for DXA | Refer for DXA | Total |
|---|---|---|---|
| Osteoporosis present | 44 (6.7%) | 96 (14.7%) | 140 |
| Osteoporosis absent | 462 (70.9%) | 50 (7.7%) | 512 |
| Total | 506 (77.6%) | 146 (22.4%) | 652 |

Preferred embodiments of the present invention have been described above, it will however be appreciated that the embodiments described are in no way limiting. Indeed, many variations to the described embodiments will be apparent to an ordinarily skilled person, and such variations are within the spirit and scope of the present invention. For example, it was explained that constants included in equation (1) were determined using logistic regression. In alternative embodiments of the invention constants included in equation (1) are determined using an alternative approach such as parametric or non-parametric classification.

The invention claimed is:

1. A method of obtaining a measurement of width of a patient's inferior mandibular cortex, the method comprising:
   generating an electronic model by a training process based upon a plurality of training images;
   receiving image data comprising image data representing the patient's lower mandibular cortex;
   processing, via an electronic processing device, the received image data to fit the electronic model to a part of the image data;
   obtaining said measurement from points of said model as fitted to said part of said image data.

2. A method according to claim 1, wherein said model is a shape model.

3. A method according to claim 1, wherein said model is a point distribution model.

4. A method according to claim 1, wherein said model is an Active Shape Model.

5. A method according to claim 1, wherein said model defines at least part of a lower border of the inferior mandibular cortex, and at least part of an upper border of the inferior mandibular cortex.

6. A method according to claim 5, wherein said shape model defines upper and lower borders of the patient's inferior mandibular cortex between the ante-gonion and mental cortical region on the left and right mandible.

7. A method according to claim 1, wherein fitting a model to a part of the image data comprises: fitting a further model to a part of the image data; fitting said model to a part of the image data based upon said fitting of said further model.

8. A method according to claim 7, wherein said further model defines at least part of a lower border of the inferior mandibular cortex.

9. A method according to claim 8, wherein fitting said further model is initialised by marking points of predetermined features in said image data.

10. A method according to claim 1, wherein fitting the shape model to the image data is based upon intensity gradient within the image data.

11. A method according to claim 1 wherein said training process is based upon human indication of points within said training images.

* * * * *